Aug. 3, 1965  W. F. HIRSCH  3,197,908
REEL SEAT FOR FISHING RODS
Filed Nov. 8, 1962  2 Sheets-Sheet 1
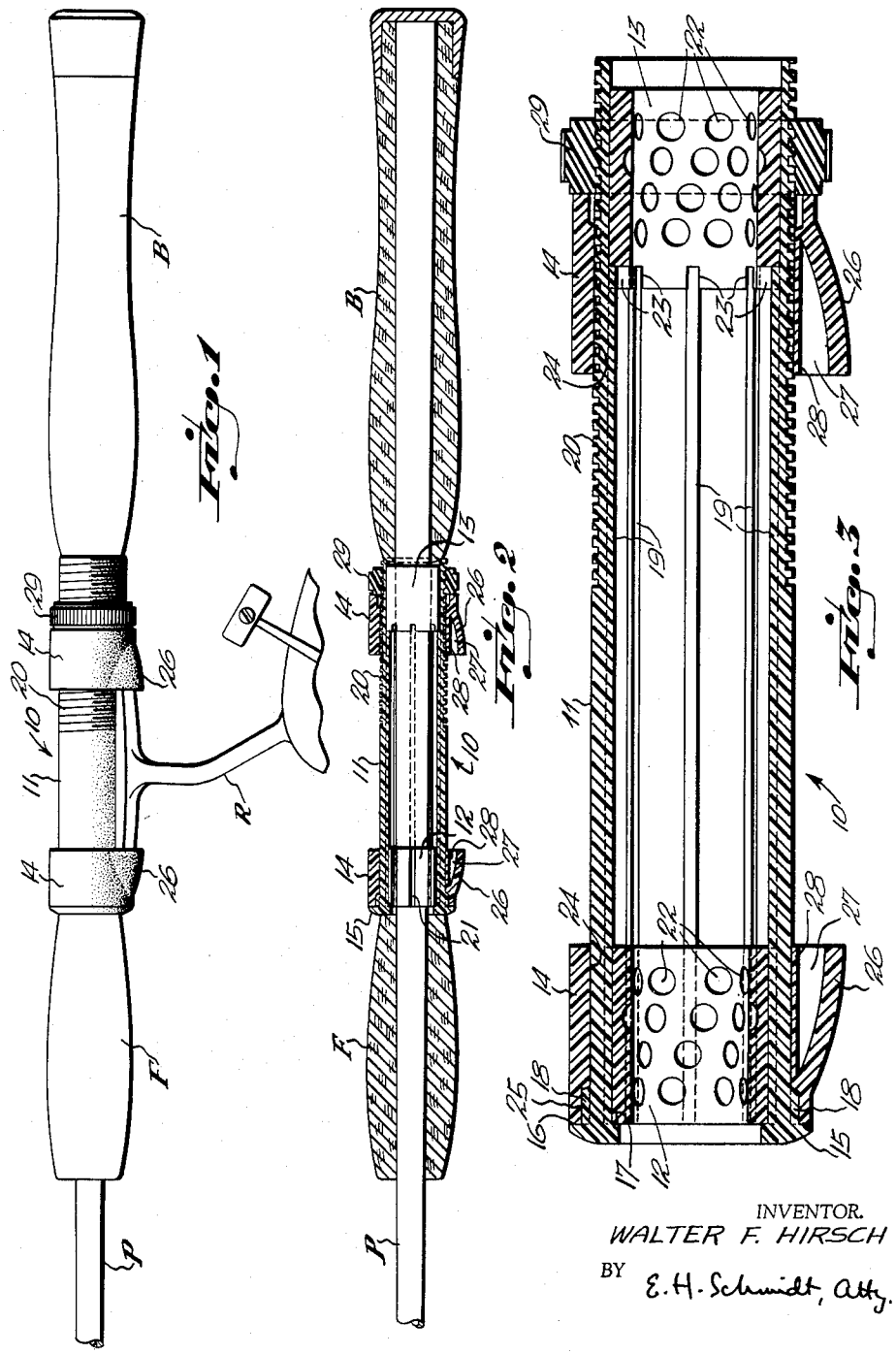
INVENTOR.
WALTER F. HIRSCH
BY E. H. Schmidt, Atty.

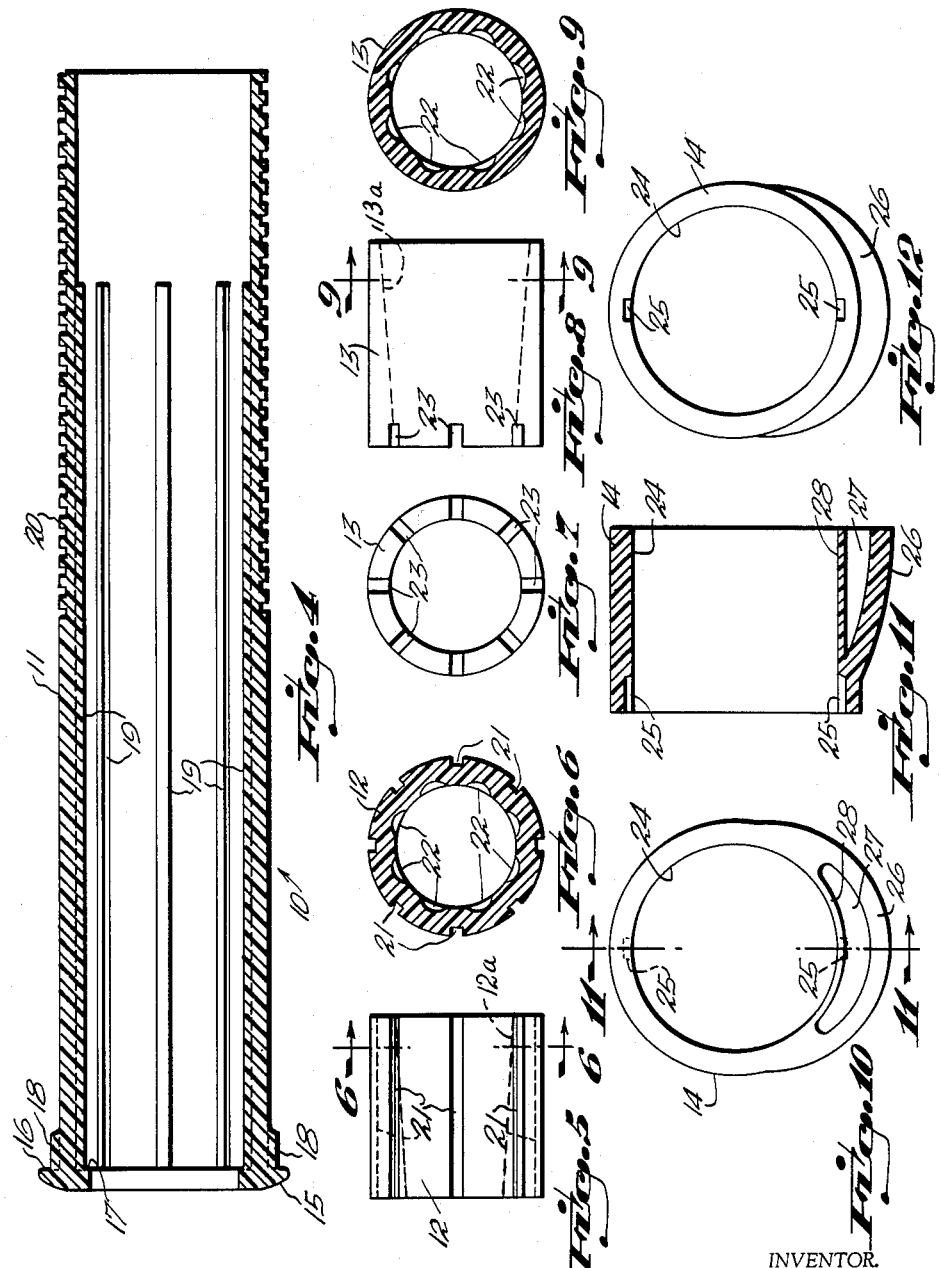

3,197,908
REEL SEAT FOR FISHING RODS
Walter F. Hirsch, Miami, Fla.
(781–783 W. 18th St., Hialeah, Fla.)
Filed Nov. 8, 1962, Ser. No. 236,352
5 Claims. (Cl. 43—22)

My invention relates to sport fishing and is directed particularly to improvements in reel seats for fishing rods.

At the present time, reel seats for fishing rods are made of three or more parts including a tubular body member, usually of metal, against which the fishing reel seats, and a pair of cylindrical bushings, usually of cork, which fit within the body member at each end and space it axially from the rod upon assembly thereto. Assembly to the rod is effected first by individually gluing the bushings to the body members, reaming the bushings to size, and then sliding the assembly down over the tapered end of the rod and gluing it in place between the butt and foregrip at the handle end. Such construction is inefficient and costly because of the many manual operations required in assembly of the parts to each other and to the rod. It is, moreover, necessary to keep in stock large quantities of cork bushings of various internal diameters to suit the particular sizes of various rods being manufactured, and further, to individually ream the bushings to size for assembly to a particular rod within the tolerance limits of a given size.

It is accordingly the principal object of this invention to provide an improved reel seat for fishing rods which overcomes the above-mentioned deficiencies of present reel seats.

A more particular object is to provide a reel seat which is of unitary structure, and which, when assembled to the rod, is self-gripping, thereby eliminating any need for gluing.

Still another object is to provide a reel seat of the character described which not only fits, without reaming or other adjustment, all rods within the tolerance limits of a given size, but will also fit a range of rod sizes, thereby greatly reducing the variety of reel seat stock needed in the manufacture of fishing rods of various sizes.

Yet another object is to provide a reel seat of the above nature which can readily be molded of synthetic plastic materials to achieve low cost of manufacture, as well as of assembly, and which thereby also eliminates the corrosion and rusting which is common with metal reel seats.

Yet another object is to provide a reel seat of the above nature which will be attractive in appearance, simple to operate, and durable in operation.

Other objects, features and advantages of the invention will be apparent from the following description when read with reference to the accompanying drawings.

In the drawings, wherein like reference numbers denote corresponding parts throughout the several views:

FIG. 1 is a side view of the handle end of a fishing rod showing a reel seat embodying the invention assembled thereto and with a spinning reel (partially illustrated) seated thereon;

FIG. 2 is a view similar to FIG. 1, but in longitudinal cross-section;

FIG. 3 is a longitudinal view of the reel seat embodying the invention, shown separately and on an enlarged scale;

FIG. 4 is a longitudinal view of the body member of the reel seat shown separately and in longitudinal cross-section;

FIG. 5 is a side view of the front bushing comprising the reel seat, shown separately;

FIG. 6 is a transverse cross-sectional view taken along the line 6—6 of FIG. 5 in the direction of the arrows;

FIG. 7 is a front view of the rear bushing comprising the reel seat, shown separately;

FIG. 8 is a side view of the rear bushing shown in FIG. 7;

FIG. 9 is a transverse cross-sectional view taken along the line 9—9 of FIG. 8 in the direction of the arrows;

FIG. 10 is a front end view of one of the reel foot-clamp members or hoods comprising the reel seat;

FIG. 11 is a longitudinal cross-section thereof taken along line 11—11 of FIG. 10; and FIG. 12 is a rear end view thereof.

Referring now in detail to the drawings, 10 in FIGS. 1, 2 and 3 designates a novel and improved reel seat embodying the invention, the same comprising, generally, a body member 11, front and rear bushings 12 and 13, respectively, and a pair of foot clamp members or hoods 14. The body member 11 and the hoods 14 are preferably formed by molding of a tough, resilient synthetic plastic such as the acetal resin plastic manufactured by E. I. du Pont de Nemours & Co., Incorporated, of Wilmington, Delaware, under their trademark "Delrin." The bushings 12 and 13 are molded of a rubber-like material such as polyethelene for the purpose hereinafter appearing.

As illustrated in FIG. 4, the body member 11 is tubular in shape and integrally formed at the front with a peripheral flange 15 providing an exterior annular shoulder 16 of increased diameter and an interior annular shoulder 17 of decreased diameter. Diametrically-opposed, short indexing keys 18 extending longitudinally into the annular shoulder 16 are also formed at the forward end of the body member 11, for the purpose hereinafter appearing. A plurality of coextensive, longitudinally-extending ribs 19, eight in the embodiment illustrated, are formed within the body member 11, being arcuately equidistantly spaced therein, and extending from the interior annular shoulder 17 of said body member to a distance of about four-fifths its length. The rear end of the body member 11 is externally threaded to a distance of about one-half its length, as indicated at 20 in FIGS. 1 through 4.

The front bushing 12 is tubular in form and of such external diameter as to permit a sliding fit within the body member 11. As illustrated in FIGS. 5 and 6, the external wall of the front bushing 12 is formed with a plurality of equidistantly spaced, longitudinally-extending end-to-end grooves 21, eight in the embodiment illustrated, of such cross-sectional size and disposition as to receive therein the interior ribs 19 of the body member 11 when assembled thereto, whereby said parts are locked against relative rotary motion.

Means is provided for gripping of the bushing 12 to a tapered fishing rod when assembled thereto. To this end, the interior wall of the bushing 12 is tapered from back to front according to the taper on the rod to which it is to be assembled. This taper is indicated in exaggerated form in FIG. 5 at 12a for purpose of illustration. The bushing 12, moreover, is of somewhat greater wall thickness than the annular space between the tapered rod and the body member 11 when in assembled position on the rod, so as to become somewhat compressed upon assembly to the rod, as is hereinbelow more fully described. The bushing 12 is also formed with a plurality of hemispherical concavities or depressions 22, which are preferably arranged in circular rows along said interior, the individual concavities of adjacent rows preferably being off-set or staggered as illustrated in FIG. 3. The interior wall taper is indicated in exaggerated form in FIG. 8 at 13a for purpose of illustration.

The rear bushing 13 differs from the front bushing 12 described above only in that instead of being formed with end-to-end interior grooves, it is provided with a like number of short slots 23 extending inwardly from the front end, adapted to receive therein end portions only of the interior ribs 19 of the body member 12.

The reel seat foot clamp members 14 are generally tubular in shape, and have an interior wall 24 of such diameter as to fit snugly over the body member 11. As illustrated in FIGS. 3, 10, 11 and 12, the inside of the front clamp member 14 is formed at one end with a pair of diametrically-opposed short slots or keyways 25 adapted to receive the indexing keys 18 of the body member 11 when said clamp member is assembled to said body member, as illustrated at the left hand side of FIG. 3, whereby relative rotation between said body member and said clamp member is prevented. The other end of each foot clamp member or hood 14 is integrally formed with an outwardly-extending arcuate hood portion 26 defining an arcuate socket 27 with the web-like wall portion 28 of said clamp member, said sockets being adapted to receive one foot each of a fishing reel R, as illustrated in FIG. 1. An externally-knurled jam nut 29 threaded on the externally-threaded portion 20 of the body member 11 behind the rear hood 14 serves to tighten said rear hood against the reel and hold it securely in place.

In assembly of my improved reel seat to a fishing rod P, which has a smooth, tapered outer surface and is usually made of a synthetic plastic reinforced with glass fibers, the butt grip B will first be slid down in place (see FIGS. 1 and 2) and secured by gluing or any other convenient manner, after which the body member 11, to which the bushings 12 and 13 will previously have been assembled as illustrated in FIG. 3, will be pushed in place against the forward end of said butt grip. The outer diameter of the rod P will be somewhat greater than the internal diameter of the bushings 12 and 13 at their assembly position so that said bushings will be squeezed in place between the rod and said body member to serve as wedges holding them in relatively fixed position. Moreover, this squeezing in place of the bushings expels air from the concavities 22 in said bushings, creating partial vacuums therein. It has been found in practice that the partial vacuums thus created serve as additional means for holding the reel seat securely in place without any need for gluing. The rod is finished by then installing the foregrip F, gluing it or otherwise securing it in place, as may be convenient.

It is to be noted that the internal ribs 19 of the body member 11 not only serve to lock the bushings 12 and 13 in place against rotation with respect to said body member, but also give additional strength to the reel seat. It will also be noted that the front bushing 12 seats up against the interior shoulder 17 of the body member 11, whereas the rear bushing 13 seats against the rear ends of the ribs 19 of said body member.

While I have illustrated and described herein only one form in which the invention may conveniently be embodied in practice, this form is given by way of example only and not in a limiting sense. The invention, in brief, comprises all the modifications and embodiments coming within the scope and spirit of the following claims.

What I claim as new and desire to secure by Letters Patent is:

1. A reel seat for tapered fishing rods comprising, in combination, a tubular body member having a front end and a back end, a sleeve-like resilient front bushing within the front end of said body member and a sleeve-like resilient rear bushing within the back end of said body member, means preventing mutual axial rotation between each of said bushings and said body member, means for securing said bushings to a back-to-front tapered fishing rod extending through said bushings, and means for removably securing a fishing reel upon said body member, said bushings securing means comprising back-to-front tapered axial openings in each of said bushings, the wall thickness of said bushings prior to assembly of said rod being greater than the annular space at said bushings between said rod and said body member, said means preventing mutual axial rotation between said bushings and said body member comprising a plurality of longitudinally-extending ribs arcuately spaced about the interior wall of said body member and integrally formed therewith, said ribs being keyed in a plurality of peripheral wall openings in each of said bushings, and said ribs extending continuously between said bushings to strengthen said body member.

2. A reel seat as defined in claim 1, wherein said ribs extend short of said other end of said body member, said peripheral openings in said front bushing comprising end-to-end grooves, said peripheral openings in said rear bushing comprising short slots at one end of said rear bushing.

3. A reel seat as defined in claim 2, wherein said bushings securing means further comprises a plurality of concavities formed within the interior wall of each of said bushings, said bushings being fabricated of a rubber-like material whereby said concavities serve as suction cups.

4. A reel seat as defined in claim 3, wherein said fishing reel securing means comprises a first sleeve-like hood secured at one end of said body member, and a second sleeve-like hood slidingly fitted over the other end of said body member and movable therealong, said hoods having facing sockets adapted to receive opposed feet on a fishing reel, and means for securing said second hood in adjusted position along said body member.

5. A reel seat as defined in claim 4, wherein said body member and said hoods are comprised of a tough synthetic plastic material.

References Cited by the Examiner

UNITED STATES PATENTS

| 206,264 | 7/78 | Robertson | 43—23 |
|---|---|---|---|
| 450,906 | 4/91 | Blakely | 43—23 X |
| 626,227 | 6/99 | Gaylor. | |
| 1,660,537 | 2/28 | Waskom. | |
| 1,817,774 | 8/31 | Sipe | 287—126 X |
| 2,091,458 | 8/37 | Sleight. | |
| 2,182,409 | 12/39 | Richards | 43—22 |
| 2,592,878 | 4/52 | Esposito | 43—22 |
| 2,780,883 | 2/57 | Macy | 43—22 |

FOREIGN PATENTS 1,126,698   7/56   France.

SAMUEL KOREN, *Primary Examiner.*